United States Patent
Yang

(10) Patent No.: US 8,121,644 B2
(45) Date of Patent: Feb. 21, 2012

(54) MOBILE PHONE CAPABLE OF AUTOMATICALLY HANDLING SMART CARD

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 424 days.

(21) Appl. No.: 12/542,729

(22) Filed: Aug. 18, 2009

(65) Prior Publication Data

US 2011/0009167 A1 Jan. 13, 2011

(30) Foreign Application Priority Data

Jul. 13, 2009 (CN) .......................... 2009 1 0304295

(51) Int. Cl.
*H04M 1/00* (2006.01)

(52) U.S. Cl. ..................... 455/558; 455/450.1; 469/626; 469/638

(58) Field of Classification Search ............... 455/550.1, 455/558; 439/626, 638
See application file for complete search history.

(56) References Cited

U.S. PATENT DOCUMENTS

2010/0270378 A1* 10/2010 Nilsson .......................... 235/486
* cited by examiner

*Primary Examiner* — Dwayne Bost
*Assistant Examiner* — Amancio Gonzalez
(74) *Attorney, Agent, or Firm* — Altis Law Group, Inc.

(57) ABSTRACT

A mobile phone capable of automatically handling smart card is provided. The phone includes a card holder for holding a smart card. The card holder includes a sheet responsive to magnetic forces. The phone further includes a plurality of electromagnets mounted in a cover of the phone. When the electromagnets are electrified one by one according to a first order, the sheet is attracted by the electromagnets one by one according to the first order, thus the card holder is drawn into the phone. When the electromagnets are electrified one by one according to a second order, the sheet is attracted by the electromagnets one by one according to a second order, thus the card holder is ejected from the phone.

5 Claims, 3 Drawing Sheets

MOBILE PHONE CAPABLE OF AUTOMATICALLY HANDLING SMART CARD

BACKGROUND

1. Technical Field

The disclosure relates to mobile phones and, particularly, to a mobile phone capable of automatically drawing in and ejecting a smart card.

2. Description of Related Art

When users want to insert a smart card into a mobile phone or pull out a smart card from a mobile phone, they usually have to first remove a cover and a battery from the mobile phone. Even if the battery doesn't cover the smart card, a cover still must be removed from the mobile phone to gain access to the smart card.

Therefore, what is needed is an electronic device which provides better access to the smart card.

BRIEF DESCRIPTION OF THE DRAWINGS

The components of the drawings are not necessarily drawn to scale, the emphasis instead being placed upon clearly illustrating the principles of a mobile phone capable of automatically handling smart card. Moreover, in the drawings, like reference numerals designate corresponding parts throughout several views.

DETAILED DESCRIPTION

Figure 1:
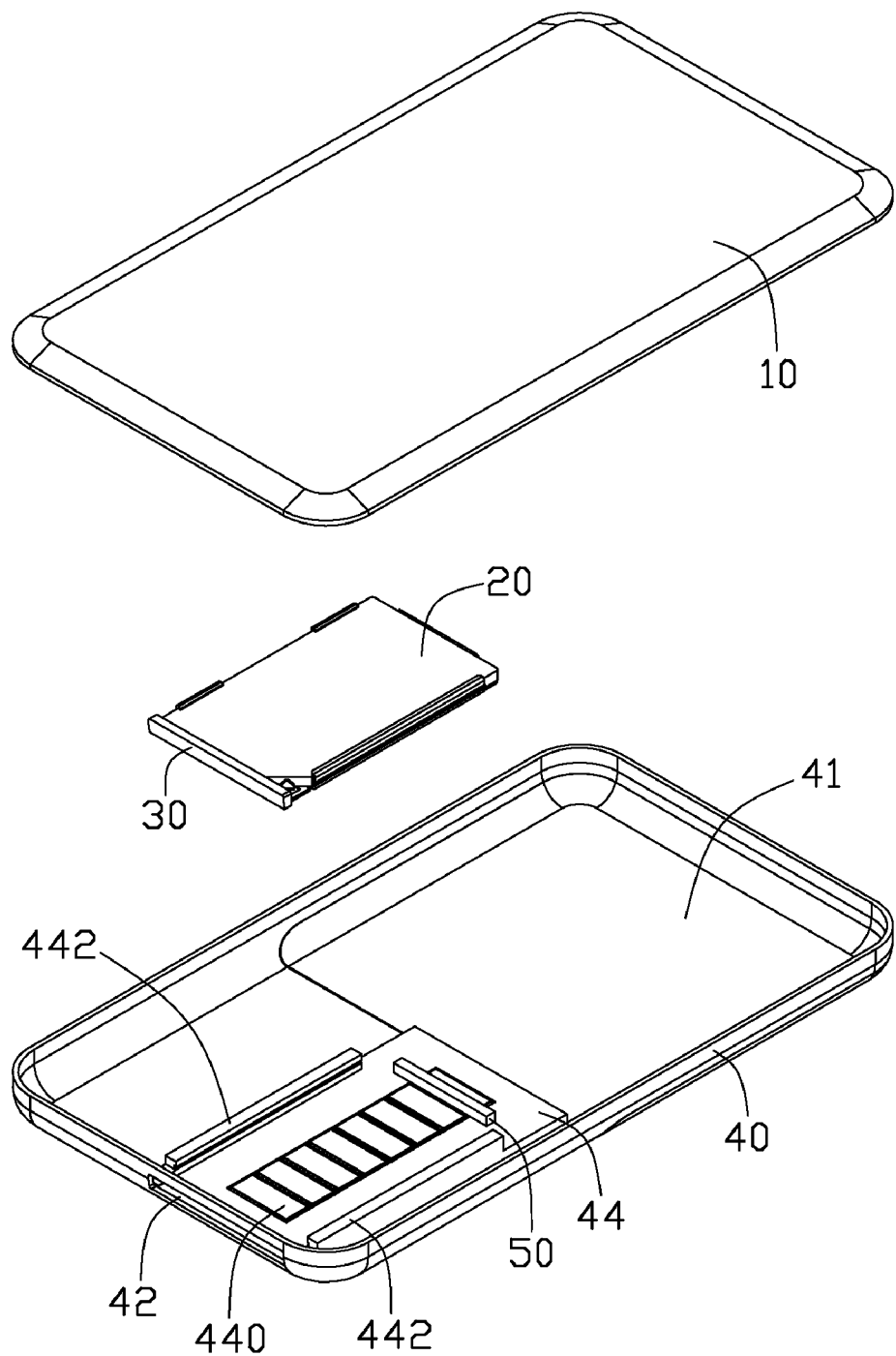
FIG. 1 is an exploded, perspective view of a mobile phone capable of automatically handling smart card in accordance with an exemplary embodiment.
Figure 2:
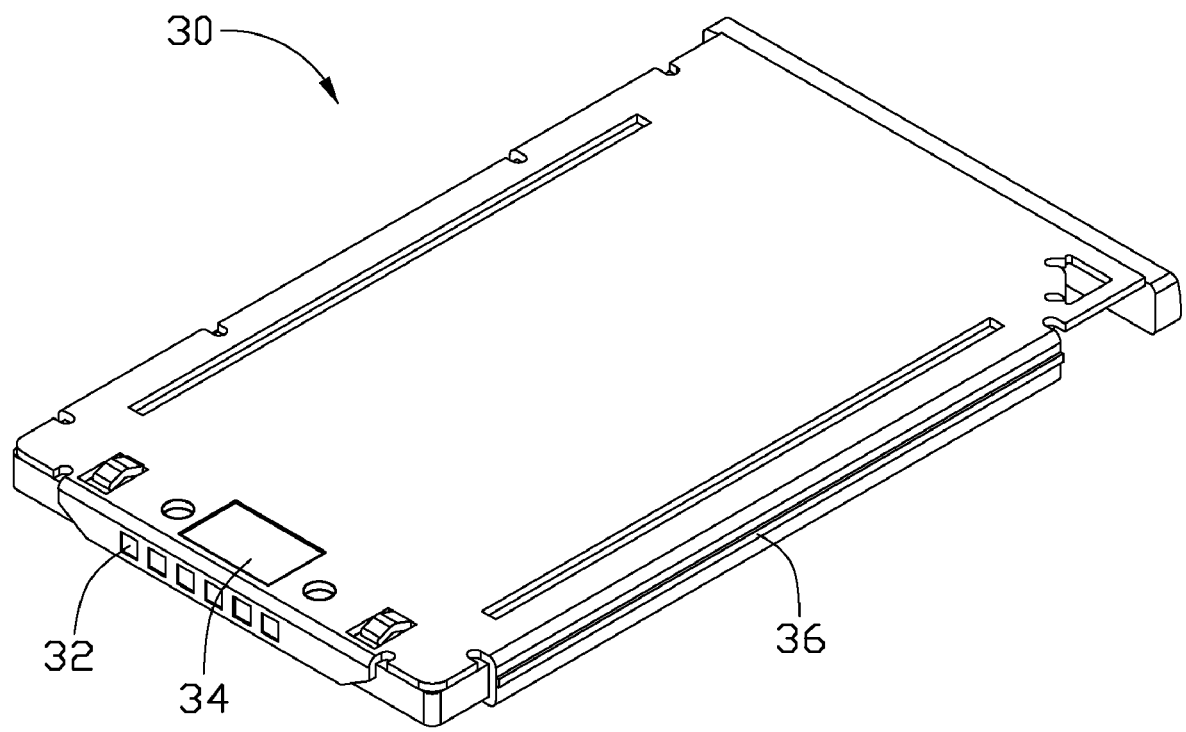
FIG. 2 is an isometric view of a card holder of the mobile phone of FIG. 1.

Referring to FIGS. 1-2, an exemplary embodiment of a mobile phone 1 is illustrated. The mobile phone 1 includes a first cover 10 and a second cover 40 secured to the first cover 10. A battery cover 41 is separately connected to the second cover 40. A battery (not shown) is mounted in the interior space formed by the first cover 10, the second cover 40, and the battery cover 41. A card connector 50 is mounted on the second cover 40.

The mobile phone 1 further includes a card holder 30 for holding a smart card 20. A plurality of contact points 32 are arranged on a sidewall of the card holder 30. The smart card 20 is electrically connected to the card connector 50 when the contact points 32 contact with the card connector 50. A sheet 34 with at least a portion thereof responsive to magnetic forces is mounted on the back of the card holder 30 and adjacent to the contact points 32. Two projection bar 36 protrude out from two sidewalls of the card holder 30, respectively.

A rectangular through slot 42 is defined in a sidewall of the second cover 40. The card holder 30 can extend through the slot 42. A supporting member 44 is mounted in the second cover 40 and adjacent to the slot 42. The supporting member 44 is provided for supporting the card holder 30. A plurality of electromagnets 440 are mounted on the supporting member 44 and are configured to attract the sheet 34 when magnetized. When the electromagnets 440 are electrified one by one according to a first order, the sheet 34 is attracted by the electromagnets 440 one by one and thus moves along a direction according to the first order, thus the card holder 30 is drawn into the mobile phone 1 along the supporting member 44, and the contact points 32 of the card holder 30 electrically contact with the card connector 50. When the electromagnets 440 are electrified one by one according to a second order, in other words, in reverse of the first order, the sheet 34 is attracted by the electromagnets 440 one by one according to the second order, thus the card holder 30 is ejected from the mobile phone along the supporting member 44. It should be made clear that as a next electromagnet 440 in the first order or the second order is electrified the previously electrified one is no longer electrified. In alternative embodiments, permanent magnetic material may be incorporated in the sheet 34, and the electromagnets 440 configured to selectively attract or repel the sheet 34 according to polarity of energizing signal supplied to the electromagnets 440. Thus the card holder 30 may be drawn in or ejected as in the first embodiment.

In the exemplary embodiment, with respect to the first order described above, it can be defined as, for example, the electromagnets 440 are electrified one by one from the electromagnet 440 which is nearest the slot 42 to the electromagnet 440 which is furthest apart from the slot 42, thus the sheet 34 is attracted by the electromagnets 440 one by one from the electromagnet 440 which is nearest to the slot 42 to the electromagnet 440 which is furthest apart from the slot 42. With respect to the second order described above, it can be defined as, for example, the electromagnets 440 are electrified one by one from the electromagnet 440 which is furthest apart from the slot 42 to the electromagnet 440 which is nearest to the slot 42, thus the sheet 34 is attracted by the electromagnets 440 one by one from the electromagnet 440 which is furthest apart from the slot 42 to the electromagnet 440 which is nearest the slot 42.

The card connector 50 is mounted between two electromagnets 440 which are apart from the slot 42. The electromagnet 440, which is furthest apart from the slot 42, attracts the card holder 30 when the card holder 30 is drawn into the mobile phone 1 along the supporting member 44, thereby causing the contact points 32 to contact with the card connector 50.

Two rails 442 are formed on the supporting member 44, and are spaced from each other. Each rail 442 defines a slot for receiving the projection bar 36 of the card holder 30. The bars 36 move along the slots of the rails 442 when the card holder 30 is drawn into the mobile phone 1 or ejected from the mobile phone.

Figure 3:
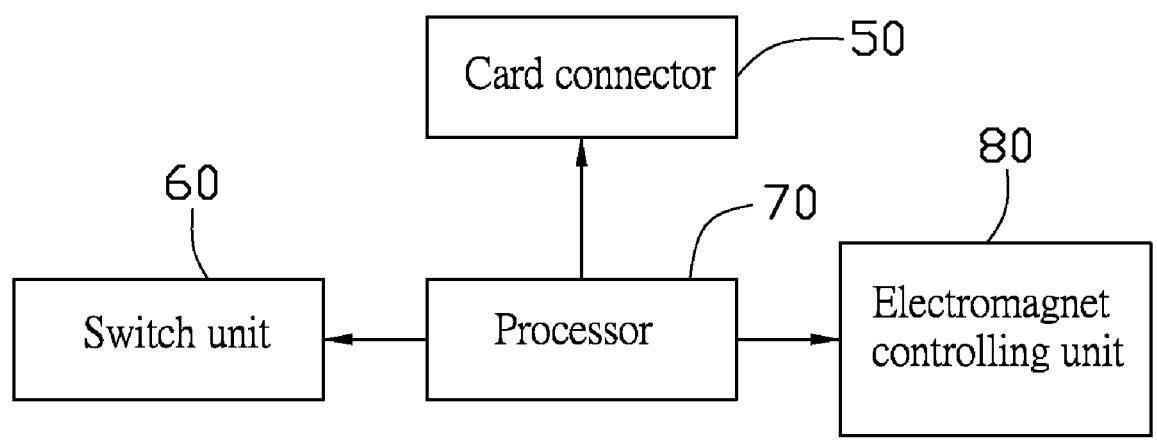
FIG. 3 is a block diagram of the mobile phone of FIG. 1.

Referring also to FIG. 3, the mobile phone 1 includes a switch unit 60, a processor 70, and an electromagnet controlling unit 80.

The switch unit 60 is configured for generating a switch signal for drawing in the card holder 30 or ejecting the card holder 30 in response to user operations.

The processor 70 is electrically connected to the connector 50, and is configured for determining whether the switch signal transmitted from the switch unit 60 is for drawing in the card holder 30 or ejecting the card holder 30.

The electromagnet controlling unit 80 is configured for electrifying the electromagnets 440 one by one according to the first order when the switch signal is determined to draw in the card holder 30, accordingly, the sheet 34 is attracted by the electromagnets 440 one by one according to the first order, and thus, the card holder 30 is drawn into the supporting member 44. The electromagnet controlling unit 80 is also configured for electrifying the electromagnets 440 one by one according to the second order when the switch signal is determined to eject the card holder 30, accordingly, the sheet 34 is attracted by the electromagnets 440 one by one according to the second order, and thus, the card holder 30 is ejected from the supporting member 44.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile phone capable of automatically handling smart card, comprising:
    a cover;
    a card connector mounted in the cover;
    a card holder for holding the smart card and comprising a plurality of contact points and a sheet with at least a portion thereof responsive to magnetic forces, wherein the sheet is mounted on the back of the card holder, and the contact points are arranged on a sidewall of the card holder and contact with the card connector when the smart card is drawn into the mobile phone, thereby the smart card is electrically connected to the card connector;
    a supporting member mounted in the cover, wherein a plurality of electromagnets are mounted on the supporting member, when the electromagnets are electrified one by one according to a first order, the sheet is attracted by the electromagnets one by one according to the first order, and thus the card holder is drawn into the mobile phone along the supporting member; when the electromagnets are electrified one by one according to a second order, the sheet is attracted by the electromagnets one by one according to the second order, thus the card holder is ejected from the mobile phone along the supporting member;
    a switch unit configured for generating a switch signal for drawing in the card holder or ejecting the card holder in response to user operations;
    a processor electrically connected to the connector and configured for determining whether the switch signal transmitted from the switch unit is for drawing in the card holder or ejecting the card holder; and
    an electromagnet controlling unit configured for electrifying the electromagnets one by one according to the first order when the switch signal is determined to draw in the card holder, and electrifying the electromagnets one by one according to the second order when the switch signal is determined to eject the card holder.

2. The mobile phone as described in claim 1, wherein a through slot is defined in a sidewall of the cover to allow the card holder to extend through.

3. The mobile phone as described in claim 2, wherein the first order is that the electromagnets are electrified one by one from the electromagnet which is nearest the slot to the electromagnet which is furthest apart from the slot, and the sheet is attracted by the electromagnets one by one according to the first order is that the sheet is attracted by the electromagnets one by one from the electromagnet which is nearest the slot to the electromagnet which is furthest apart from the slot; and the second order is that the electromagnets are electrified one by one from the electromagnet which is furthest apart from the slot to the electromagnet which is nearest to the slot, and the sheet is drawn by the electromagnets one by one according to the second order is that the sheet is attracted by the electromagnets one by one from the electromagnets which is furthest apart from the slot to the electromagnets which is nearest the slot.

4. The mobile phone as described in claim 2, wherein the card connector is mounted between two electromagnets which are furthest apart from the slot.

5. The mobile phone as described in claim 1, two projection bar protrude out from two sidewalls of the card holder respectively, and two rails are formed on the supporting member, the projection bar move along the rails when the card holder is drawn into the mobile phone or ejected from the mobile phone along the supporting member.

* * * * *